United States Patent [19]

Hartmann

[11] Patent Number: 4,666,172
[45] Date of Patent: May 19, 1987

[54] MULTIPLE SPEED PLANETARY TRANSMISSION FOR PEDAL-POWERED VEHICLES

[76] Inventor: Dirck T. Hartmann, 4121 Morningstar Dr., Huntington Beach, Calif. 92649

[21] Appl. No.: 848,805

[22] Filed: Apr. 7, 1986

[51] Int. Cl.$^4$ .......................... B62M 1/08; F16H 3/44
[52] U.S. Cl. .................................... 280/238; 74/594.2; 74/750 B; 192/6 A; 280/231; 280/236; 280/260
[58] Field of Search ............... 280/210, 236, 238, 260, 280/270, 231, 230; 74/750 B, 594.2; 192/6 A

[56] References Cited

U.S. PATENT DOCUMENTS

| | | | |
|---|---|---|---|
| 619,118 | 2/1899 | Barnes | 280/260 |
| 707,359 | 8/1902 | Scharbach | 280/238 X |
| 1,184,321 | 5/1916 | Chapin | 280/270 |
| 1,506,565 | 8/1924 | Clatworthy | 280/7.15 |
| 1,798,384 | 3/1931 | Roberds | 280/260 |
| 2,505,464 | 4/1950 | Debuit | 280/260 |
| 3,728,912 | 4/1973 | Darnell | 280/236 X |
| 3,863,503 | 2/1975 | Loeb et al. | 280/238 X |
| 3,920,263 | 11/1975 | Bundschuh | 280/236 |
| 3,934,481 | 1/1976 | Foster | 280/236 |
| 4,069,725 | 1/1978 | Segawa | 192/6 A X |
| 4,376,394 | 3/1983 | LaPeyre | 192/6 A X |
| 4,447,068 | 5/1984 | Brooks | 280/260 |
| 4,577,531 | 3/1986 | Bergles | 74/750 B X |

FOREIGN PATENT DOCUMENTS 0029359 11/1980 European Pat. Off. .
0158466 3/1985 European Pat. Off. .
2610644 3/1976 Fed. Rep. of Germany .

Primary Examiner—John J. Love
Assistant Examiner—Mitchell J. Hill
Attorney, Agent, or Firm—Fulwider, Patton, Rieber, Lee & Utecht

[57] ABSTRACT

A multiple speed planetary transmission which mounts inside the wheel hub of the driving wheel or wheels of a bicycle or the like, concentric with the pedal drive shaft. The transmission includes a gear case mounted on ball bearings on the pedal drive shaft, a cylindrical extension of the gear case being clamped to the bicycle frame on one side. Multiple sets of different size planet gears are rotatably mounted on a planet gear carrier fitting driven by the pedal drive shaft. A ring gear is mounted in tracks in the gear case with its axial position adjustable so that it can be positioned to mesh with any one of multiple sets of different size planet gears. A sun gear assembly has its multiple gears in constant mesh, respectively, with multiple sets of planet gears. A conventional free-wheel ratchet mechanism drives the wheel hub from the sun gear assembly, and a second conventional free-wheel ratchet mechanism drives the sun gear assembly from the drive shaft to provide a direct drive option. This compact, low maintenance transmission permits the wheelbase for a tandem bicycle using it to be the same as the wheelbase for a conventional single bicycle.

6 Claims, 9 Drawing Figures

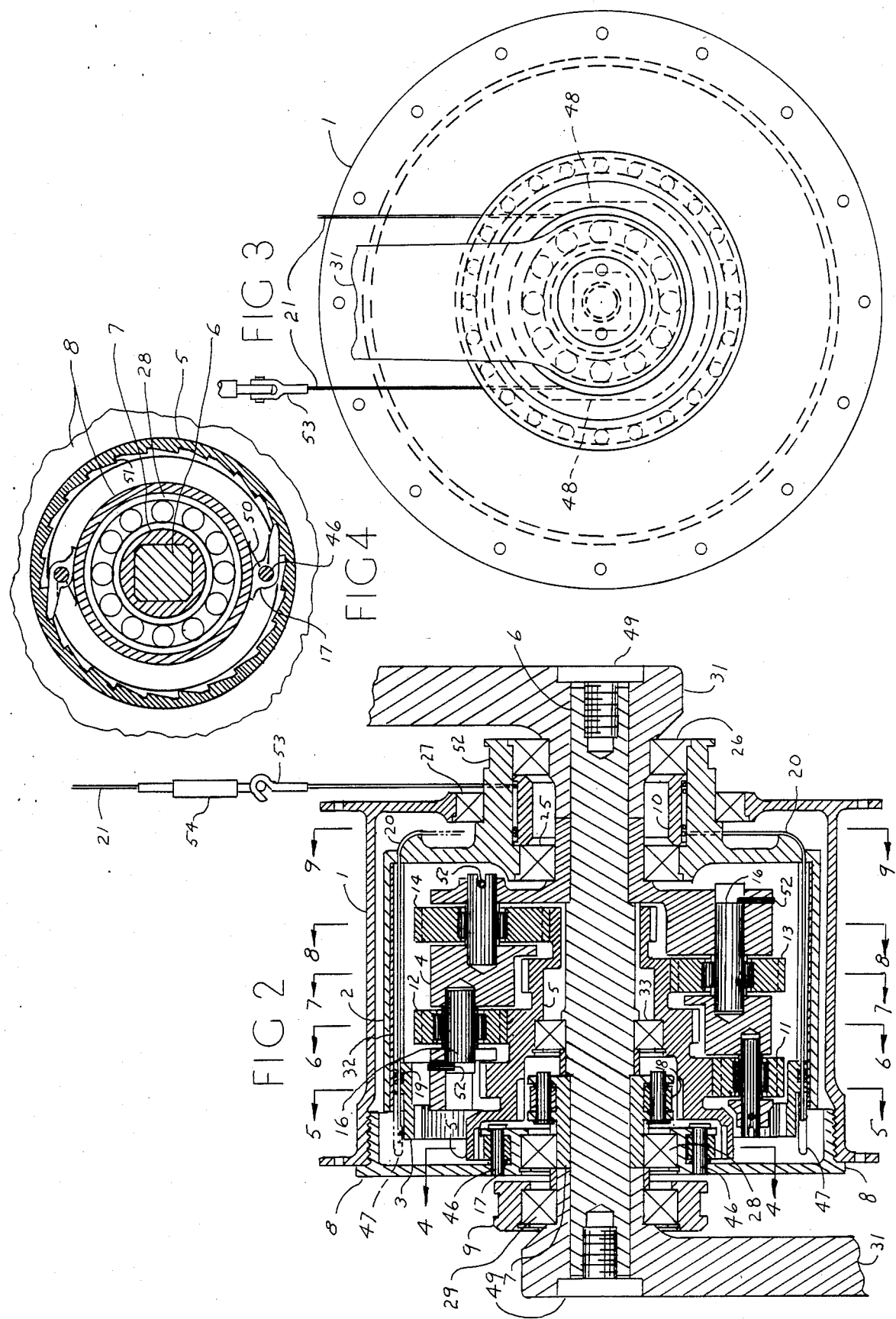

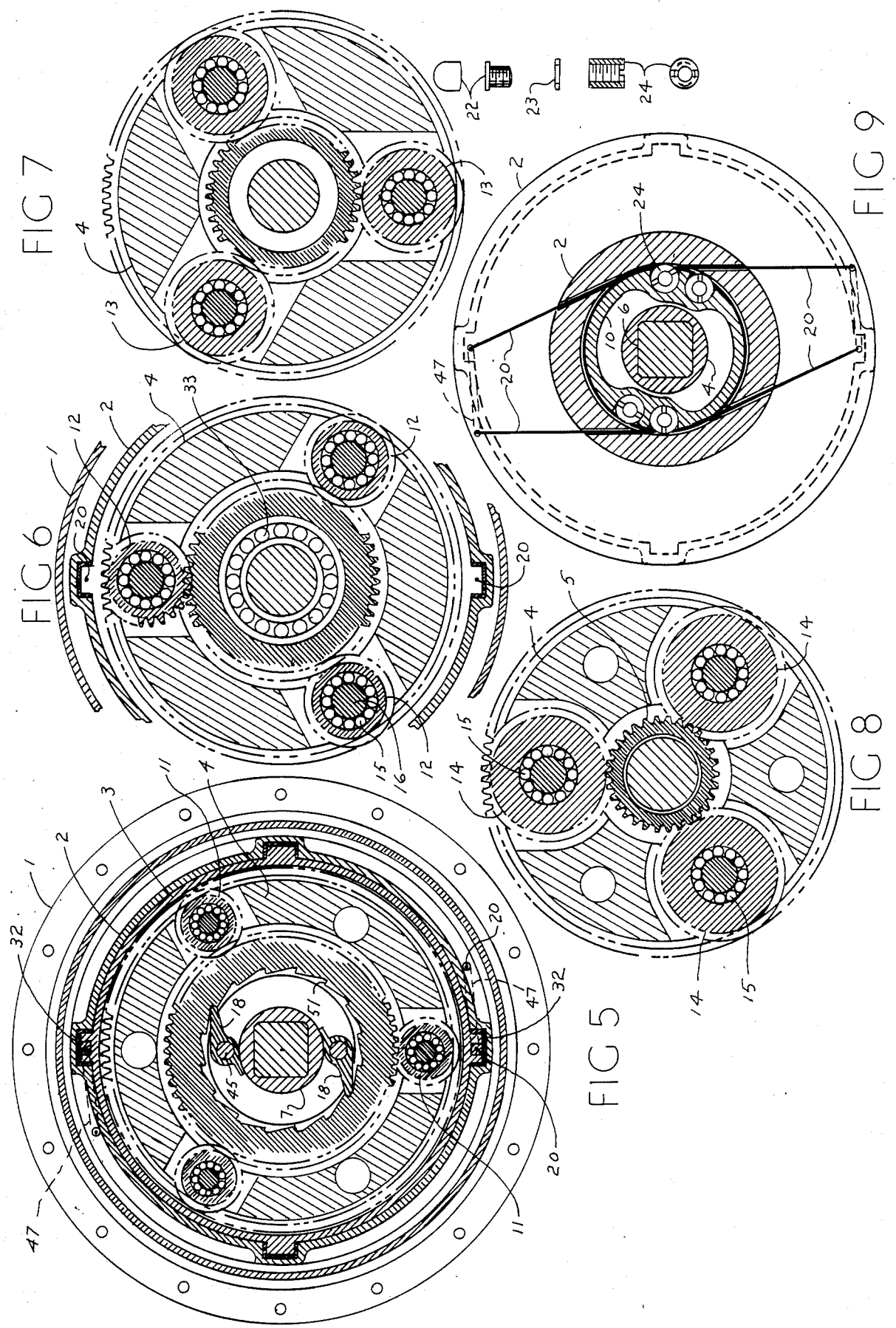

MULTIPLE SPEED PLANETARY TRANSMISSION FOR PEDAL-POWERED VEHICLES

BACKGROUND OF THE INVENTION

1. Field of the Invention

This invention relates generally to transmissions for pedal-powered vehicles such as tandem bicycles, bicycles, and tricycles, and more particularly to bicycle drive mechanisms of the chainless type.

2. Description of the Prior Art

The most common prior art multiple speed bicycle uses a chain and derailleur system. The chain requires periodic cleaning and oiling for efficient operation and to prevent premature chain failure. Also, when the rider is bearing down on the pedals on a hill, the derailleur usually cannot carry the chain to a lower gear. Consequently, with the chain/derailleur system the cyclist must anticipate the terrain and shift before reaching a hill in a gear that is too high and finding he cannot shift into a lower gear. These problems are eliminated with the present invention, as will be seen.

SUMMARY OF THE INVENTION

An object of the invention is to provide a compact, low maintenance drive mechanism, particularly for a tandem bicycle, that will allow each rider to pedal at his own cadence, and that can also serve as a low maintenance, chainless drive for single bicycles and tricycles.

Briefly, the transmission of this invention includes a pedal drive shaft on the axis of the wheel; a planet gear carrier fitting mounted on and driven by the pedal drive shaft; four sets of different size planet gears, with three planet gears in each set, mounted on roller bearings on the planet gear carrier fitting; a gear case mounted on two ball bearings on the pedal drive shaft with an integral cylindrical extension of the gear case clamped to the bicycle frame so that the gear case cannot rotate; a ring gear mounted in tracks in the gear case with its axial position adjustable by a winch and cable system so that it can be positioned to mesh with any one of the four sets of planet gears, or with none of them; a sun gear assembly with each of its four gears in constant mesh with one of the four sets of planet gears; and two conventional free-wheel ratchet mechanisms, one on the sun gear assembly driving the wheel hub, and the other on the drive shaft driving the sun gear assembly. When the set of planet gears in mesh with the fixed ring gear is driven by the carrier fitting at pedal speed, it drives the sun gear assembly at a multiplied rate of speed, with the multiple sets of planet gears providing the desired gear ratios, as will be seen.

An advantage of this invention is its compactness which permits the transmission to be installed inside the wheel hub where, with shielded ball bearings, it is well protected from dirt so that the high efficiency inherent in the arrangement will be preserved with little maintenance.

The transmission in accordance with the present invention can be used in both wheels of a tandem bicycle, with the seat post for the forward rider on the axis of the front fork and steering torque provided by the rear rider.

BRIEF DESCRIPTION OF THE DRAWING

FIG. 2 is a cross sectional view taken along the line 2—2 of FIG. 1, transmission being shown separate from the bicycle for clarity;

FIG. 3 is an elevational end view of the hub of the wheel;

FIG. 4 is a cross sectional view taken along the line 4—4 of FIG. 2;

FIG. 5 is a cross sectional view taken along the line 5—5 of FIG. 2;

FIG. 6 is a cross sectional view taken along the line 6—6 of FIG. 2;

FIG. 7 is a cross sectional view taken along the line 7—7 of FIG. 2;

FIG. 8 is a cross sectional view taken along the line 8—8 of FIG. 2;

FIG. 9 is a cross sectional view taken along the line 9—9 of FIG. 2; and

FIG. 10 is an exploded detail view of one of the clamping assemblies for clamping the cable to the winch.

DESCRIPTION OF THE PREFERRED EMBODIMENTS

Figure 1:
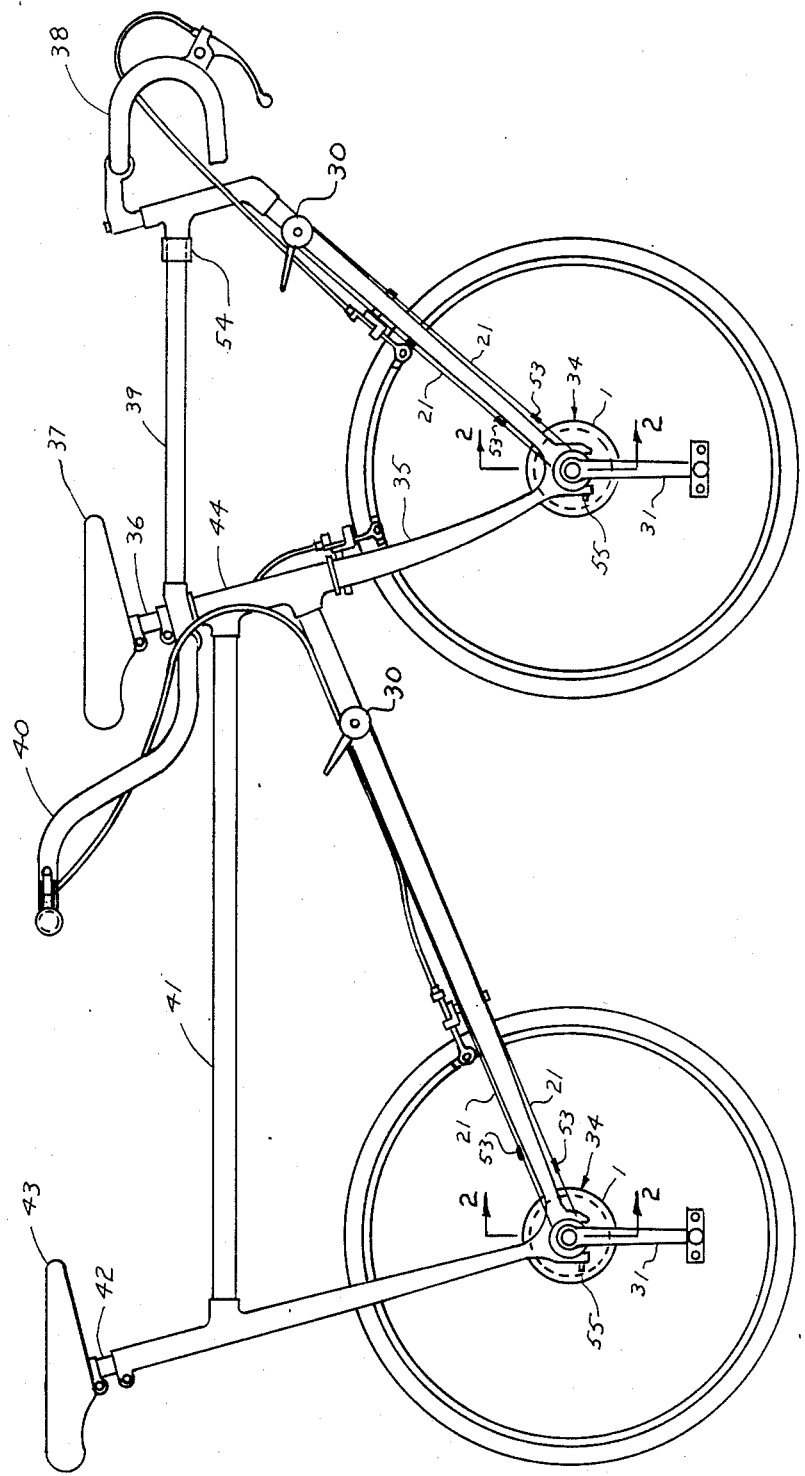
FIG. 1 is the side view of a two wheel drive tandem bicycle with the transmission of the present invention located in each wheel.

Referring to FIG. 2, the multiple speed transmission in accordance with the present invention includes a wheel hub 1, a gear case 2, a ring gear 3, a planet gear carrier fitting 4, a sun gear assembly 5, a pedal drive shaft 6, a free-wheel ratchet fitting 7, a wheel hub driving plate 8, a bicycle frame attachment fitting 9, a cable winch 10, and planet gears 11, 12, 13, and 14.

The gear case 2 is mounted on a ball bearing 25 on a cylindrical extension of the planet gear carrier fitting 4, and on a ball bearing 26 on a cylindrical extension of the right hand side pedal crank arm 31. As seen in the cross sectional views 4, 5, and 9, the pedal drive shaft 6 has a square cross section at both ends for the transfer of torque from the pedal crank arms 31 to the planet gear carrier fitting 4, and to the free-wheel ratchet fitting 7. As seen in FIG. 5, a pair of spring loaded dogs 18 are mounted in the ratchet fitting 7 with steel pins 46, and engage machined cogs 51 in the sun gear assembly 5 to drive it at the pedal rate when it is not driven by the planet gears, providing a direct drive.

As seen in FIGS. 2 and 5, four hardened steel tracks 32 are installed in the cast aluminum gear case 2. Four radial extensions on the ring gear 3 fit closely in the four channel-shaped tracks 32, positioning the ring gear in the gear case 2. Each of the two cable assemblies 20 has a swaged collar 19 which is trapped in a slot in the ring gear 3. From the collar 19 the cable 20 passes to the right out through a hole in the gear case 2. The cable extends from the collar 19 to the left through a 180 degree section of small diameter steel tubing 47 carried by the gear case 2. This reverses its direction so that it again passes to the right out through a hole in the gear case 2.

As seen in FIG. 2, the cable winch 10 is located between the bearings 25 and 26 which mount the gear case 2. As seen in FIG. 9, the two ends of each of the two cable assemblies 20 are clamped in the extruded aluminum winch 10 by a screw 22, a clamping washer 23, and the threaded collar 24. Rotating the winch 10 clockwise, as viewed in FIG. 9, moves the ring gear 3 from the lower to the higher gears (from left to right as viewed in FIG. 2), and rotating the winch counterclockwise moves the ring gear 3 in the opposite direction.

Rotation of the winch 10 is accomplished with an external cable assembly 21 having a cable which passes out through two holes in the cylindrical extension of the gear case 2, passing outboard of the wheel bearing 27 and inboard of the bearing 26 and to the winch 30 mounted on the bicycle frame, as seen in FIG. 1. A spring loaded detent (not shown) on the winch 30 indicates the five ring gear positions corresponding to the five gear ratios available with the illustrated transmission.

The wheel hub 1 is supported on its right and side by the ball bearing 27 seated on a cylindrical extension of the gear case 2, and on its left side by the wheel hub driving plate 8 which is supported by a ball bearing 28 seated on a cylindrical extension of the ratchet fitting 7.

As seen in FIGS. 2 and 4, a pair of dogs 17 are mounted in the driving plate 8 with steel pins 46, and are held in engagement with machined cogs 51 in the sun gear assembly 5 by springs 50 so that the sun gear assembly drives the wheel hub driving plate 8, but allows it to free-wheel such as when the sun gear is stopped. The driving plate 8 is threaded into the wheel hub 1 with left hand threads so that the driving torque is tightening.

As seen in FIG. 2, on the right hand side of the bicycle the outboard end of the cylindrical extension on the gear case 2 has a circumferential groove 52 for interfacing with the bicycle frame. As seen in FIG. 3, flat areas 48 in the groove 52 prevent the gear case from rotating when the transmission is installed in the bicycle frame. On the left hand side of the bicycle the frame interface fitting 9, which mates with the bicycle frame on the left side, is supported by the ball bearing 29 seated on the cylindrical extension of the left side pedal crank arm 31.

The axial position of the sun gear assembly 5 is maintained by a ball bearing 33 which is captive between a shoulder and a snap ring in the sun gear assembly 5, and captive between a shoulder and a spacer sleeve on the pedal drive shaft 6. Spanner bolts 49 attach the pedal crank arms 31 to the pedal drive shaft 6, tie the whole transmission assembly 34 together and, with suitable shoulders, snap rings, and spacer sleeves between bearing 28 and 29, and between bearing 28 and the ratchet fitting 7, and between the ratchet fitting 7 and the bearing 33, maintain the axial position of all associated components of the transmission 34.

As seen in FIGS. 2, 6, 7 and 8, the planet gears 12, 13, and 14 are each mounted on twelve small rollers 15 which roll between the planet gear and a hardened steel pin 16 which is held captive in the planet gear carrier fitting 4 by a spring pin 52. The same arrangement is used for mounting the planet gears 11 except the size of the roller bearings is reduced, as seen in FIG. 5. Small integral shoulders on the planet gears maintain the positions of the rollers in the gears, and thin steel sleeves inserted over the pins 16 and located between the ends of the rollers and the walls of the planet gear carrier fitting 4, maintain the position of the rollers on the pins 16.

With the ring gear fixed by the bicycle frame, and the planet gear carrier fitting driven at the pedal rate, the sun gear is driven at a multiplied rate. The ratio of the sun gear rate to the pedal rate, which is the transmission gear ratio, is given by $(N+n)/0.5N$ where N is the number of teeth in the sun gear, and n is the number of teeth in the planet gear. With three planet gears located 120 degrees apart on the planet gear carrier fitting, the number of teeth in the ring gear and in each sun gear must be divisible by three. With adjacent sets of planet gears located 60 degrees apart, as seen in FIGS. 5, 6, 7, and 8, if the number of teeth on the ring gear and on each sun gear is divisible by six, and if the gears on the sun gear assembly are indexed so that the teeth on all four gears are aligned at 60 degree intervals, the planet gears will be properly indexed to mesh with the ring gear as it slides from one set of planet gears to the next every 60 degrees of sun gear rotation.

32 pitch gears were selected for the illustrated design, with 102 teeth and a resulting pitch diameter of 3.1875 inches for the ring gear 3. The number of teeth in each of the four sun gears and in their mating planet gears is given in the table below with the resulting gear ratio and equivalent wheel diameter for a 24 inch diameter bicycle wheel.

| Gear | N | n | Ratio | Equiv. Dia. (in.) |
| --- | --- | --- | --- | --- |
| First | direct drive | | 1.0 | 24 |
| Second | 66 | 18 | 2.545 | 61.1 |
| Third | 54 | 24 | 2,889 | 69.3 |
| Fourth | 42 | 30 | 3.428 | 82.3 |
| Fifth | 30 | 36 | 4.4 | 105.6 |

The transmission 34 is installed in each of the wheels of the dual wheel drive tandem bicycle shown in FIG. 1. The seat post 36 for the forward rider is located on the axis of the front fork 35 so that the seat 37 and the forward rider rotate with the front fork. Steering torque is provided by the rear rider through the handle bars 40. The handlebars 38 serve only to support the forward rider in the conventional crouched riding position. The seat 43 for the rear rider is mounted on the seat post 42, the centerline of which passes through the center of the rear wheel. The wheel base and the location of both seats relative to the pedals is identical to that for a conventional chain driven single bicycle.

A threaded coupling 54 permits the frame member 39 with the handlebars 40 and the seat post 36 to be removed from the front fork 35 so that the front fork can be removed from the bearings captive in the head tube 44, and separated from the rear frame 41. Quick disconnects 53 permit the external cable assembly 21 to be separated so that the wheel hub and wheel can be removed from the bicycle frame by backing off the locking screw 55. Rotating the turnbuckle 54 associated with one of the quick disconnects 53, as shown in FIG. 2, produces sufficient slack in the cable to separate that quick disconnect, after which the winch 30 can be rotated to produce the slack required for separating the second quick disconnect in the external cable assembly 21.

While this invention has been described in terms of a few preferred embodiments, it is anticipated that persons reading the preceding descriptions and studying the drawings will realize various possible alterations and modifications thereof. For example, many alternate gear ratios are of course possible as well as additional speeds, and the planet gears could be mounted on journal bearings or ball bearings rather than the small cageless roller bearings that are shown, or a spline could be used for transferring torque from the pedal crank arms to the planet gear carrier fitting and drive shaft mounted ratchet fitting rather than the square cross section on the pedal drive shaft. In some applications for this invention altered embodiments will prove advantageous.

It is therefore intended that the following appended claims be interpreted as including all such alterations and modifications as fall within the true scope and spirit of the present invention.

I claim:

1. In a pedal-powered vehicle including a pedal drive shaft, a frame, and a driving wheel having a hub concentric with the axis of rotation of said drive shaft, an improved multiple speed, chainless planetary transmission mounted within said hub and in concentric relation with the axis of rotation of said hub and comprising:
   a gear case fixed to said frame and including axially extending guide tracks;
   a planet gear carrier mounted to said drive shaft for rotation therewith;
   multiple sets of different size planet gears rotatably carried by said carrier;
   an internally toothed ring gear supported upon said guide tracks and axially movable along said guide tracks for selected meshing with any one of said multiple sets of said planet gears;
   sun gear means having a plurality of externally toothed sun gears meshed with said multiple sets of said planet gears, respectively, and supported for concentric rotation about said drive shaft;
   first free-wheel ratchet means coupled between said hub and said sun gear means for driving said hub;
   second free-wheel ratchet means coupled between said pedal drive shaft and said sun gear means for driving said sun gear means; and
   ring gear positioning means operable for axially moving said ring gear along said guide tracks whereby said hub is adapted to be driven at a selected rate of rotation depending upon the particular set of said multiple sets of said planet gears engaged by said ring gear.

2. In a pedal-powered vehicle including a pedal drive shaft, a frame, and a driving wheel having a hub concentric with the axis of rotation of said drive shaft, an improved multiple speed, chainless planetary transmission mounted within said hub and in concentric relation with the axis of rotation of said hub and comprising:
   a gear case located within said hub and including an end having a cylindrical extension fixed to said frame, said gear case including axially extending guide tracks;
   a planet gear carrier fixed to said drive shaft for rotation therewith;
   multiple sets of different size planet gears rotatably carried by said carrier;
   an internally toothed ring gear supported upon said guide tracks and axially movable along said guide tracks for selected meshing with any one of said multiple sets of said planet gears;
   sun gear means having multiple externally toothed sun gears in constant mesh with said multiple sets of said planet gears, respectively, and supported for concentric rotation about said drive shaft;
   first free-wheel ratchet means coupled between said hub and said gear means for driving said hub;
   second free-wheel ratchet means coupled between said pedal drive shaft and said sun gear means for driving said sun gear means by said drive shaft in the absence of meshing of said ring gear with any of said multiple sets of said planet gears; and
   ring gear positioning means operable for axially moving said ring gear along said guide tracks whereby said hub is adapted to be driven at a selected rate of rotation depending upon the particular set of said multiple sets of said planet gears engaged by said ring gear.

3. A transmission according to claim 2 wherein said vehicle includes left and right pedal crank arms for rotating said drive shaft; wherein said planet gear carrier includes an end having a cylindrical extension; and including an inboard ball bearing disposed between said cylindrical extensions of said planet gear carrier and said gear case; and further including a right outboard ball bearing disposed between said gear case and said right crank arm; and further including frame interface means and a left outboard ball bearing disposed between said frame interface means and said left crank arm.

4. A transmission according to claim 3 wherein said ring gear positioning means includes a winch positioned inside said cylindrical extension of said gear case, and between said inboard and right outboard ball bearings; a pair of cable assemblies, each including a cable having a central portion coupled to said ring gear and end portions coupled to said winch, said pair of cable assemblies each further including means for reversing the direction of travel of said cable; and further including means for moving said cable for rotating the winch to selectively position said ring gear.

5. A transmission according to claim 2 and including a wheel hub driving plate and a first ball bearing carried by said second free-wheel ratchet means and a second ball bearing carried by said cylindrical extension of said gear case, said hub being supported at its opposite ends by said wheel hub driving plate and said second ball bearing.

6. A transmission according to claim 2 wherein said vehicle is a dual wheel drive tandem bicycle having a front fork and a front seat post carried by said front fork for a forward rider, said seat post being on the axis of and rotating with said front fork; handlebars attached to said front fork under said seat post; and a rear seat post having a centerline passing approximately through the bicycle rear wheel, and wherein a pair of said transmissions are used in said dual wheels, respectively.

* * * * *